United States Patent Office 3,696,005
Patented Oct. 3, 1972

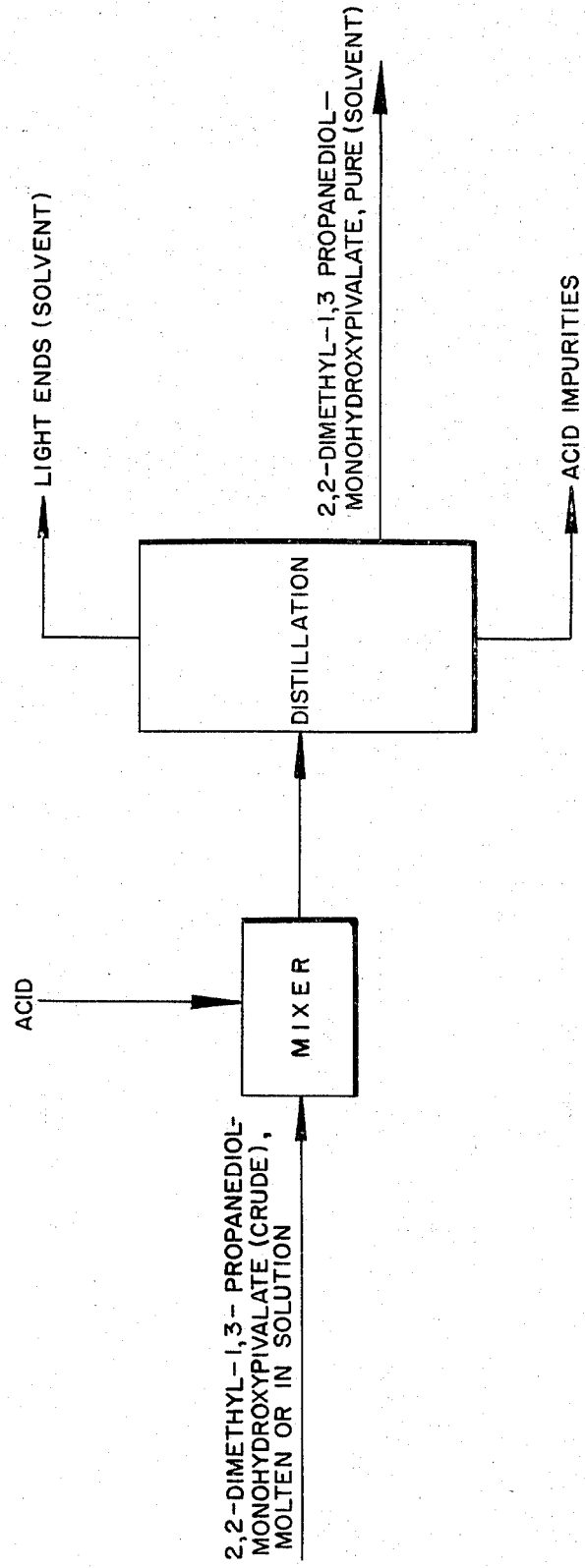

3,696,005
PURIFICATION OF 2,2-DIMETHYL-1,3-PROPANE-
DIOL MONOHYDROXYPIVALIC ESTER BY DIS-
TILLATION WITH SULPHURIC OR SULPHONIC
ACID
Werner Fuchs, 30b Muenchbuschweg, and Franz Merger,
8 Homburger Strasse, both of 6700 Ludwigshafen,
Germany
Filed June 17, 1970, Ser. No. 47,150
Claims priority, application Germany, June 26, 1969,
P 19 32 420.0
Int. Cl. B01d 3/34; C07c 69/66
U.S. Cl. 203—35                                    7 Claims

ABSTRACT OF THE DISCLOSURE

Purification of 2,2-dimethyl-1,3-propanediol monohydroxypivalic ester by distilling the crude product in the presence of an acid compound. 2,2-dimethyl-1,3-propanediol monohydroxypivalic ester purified by the invention is a starting material for synthetic resins, plasticizers and plastics auxiliaries and may be employed for uses which require very high purity such as the production of colorless polyesters for the plastics, surface coatings and plasticizer industries.

The invention relates to a process for purifying 2,2-dimethyl-1,3-propanediol monohydroxypivalic ester by distilling the crude product in the presence of an acid compound.

2,2-dimethyl-1,3-propanediol monohydroxypivalic ester is prepared by means of the Tishchenko reaction for example according to the methods described in U.S. Pat. No. 3,057,911 or German printed application No. 1,168,411 from hydroxypivalaldehyde and contains impurities which cause an undesirable yellow discloroation in a number of reactions, for example in the condensation with maleic anhydride for the production of light-resistant, difficultly hydrolyzable and air-drying polyesters in the plastics and coating intermediates industries. Repeated distillation of the ester does not remove the said impurities.

Purification by means of acid ion exchangers is the subject of Belgian Pat. No. 721,861. Although this method gives a good purification effect it does not afford a commercially satisfactory solution as regards economy, expenditure for apparatus, speed of the purification or the use of solvents.

The object of this invention is to provide a new process for the purification of 2,2-dimethyl-1,3-propanediol monohydroxypivalic ester in better yields and higher purity.

This and other objects are achieved and 2,2-dimethyl-1,3-propanediol monohydroxypivalic ester can be advantageously purified in the presence of acid compounds by distilling the crude product at a temperature above 100° C. in the presence of sulfuric acid or a sulfonic acid.

Contrasted with the prior art methods, the process according to the invention gives 2,2-dimethyl-1,3-propanediol monohydroxypivalic ester in practically quantitative yields and in a purity which satisfies the abovementioned requirements in a simpler and more economical manner. In spite of the use of the said acids and the high distillation temperature, transesterifications and decomposition of the ester are not observed to any appreciable extent. Purification can be carried out in a shorter time and with less equipment than in the prior art methods.

The crude ester is distilled in the presence of sulfuric acid or a sulfonic acid, preferably in an amount of from 0.05 to 5% molar, particularly from 0.5 to 2% molar, based on the mixture of ester and acid. Preferred acids are those having the general formula:

$$R-SO_3H \qquad (I)$$

where R denotes a hydroxyl group, a halogen atom, preferably a chlorine atom, an aliphatic or cycloaliphatic radical, preferably an alkyl or alkenyl radical having 1 or 2 to 6 carbon atoms, or a cycloalkyl or cycloalkenyl radical having 5 to 8 carbon atoms, or an aromatic radical, preferably an aryl radical having 6 to 14 carbon atoms. The sulfonic acids may be polysulfonic acids, for example disulfonic acids or preferably monosulfonic acids. The sulfuric acid is used as a rule without dilution with water, but sulfuric acid which has been diluted with water down to a concentration of 0.1% by weight of acid may also be used. The said preferred radicals may also bear, as substituents, groups and/or atoms which are inert under the conditions of the purification, for example alkyl groups or alkoxy groups each having 1 to 4 carbon atoms, chlorine atoms, oxo groups or nitro groups.

The following sulfonic acids are suitable for example: benzenesulfonic acid, benzenedisulfonic acids, toluenesulfonic acids, xylenesulfonic acids, mesitylsulfonic acids, α-naphthylsulfonic acids, β-naphthylsulfonic acids, anthracenesulfonic acids, methylsulfonic acid, ethylsulfonic acid, 1-propylsulfonic acid, isopropylsulfonic acid, 1-n-butylsulfonic acid, 1-pentylsulfonic acid, 1-hexylsulfonic acid, cyclohexylsulfonic acid, isobutenylsulfonic acid, vinylsulfonic acid, anisylsulfonic acid, p-chlorophenylsulfonic acid, anthraquinonesulfonic acid, 2-nitroanthraquinonesulfonic acid, isobutyraldehyde-α-sulfonic acid and chlorosulfonic acid.

Distillation is carried out at a temperature of more than 100° C., preferably from 100° to 185° C., particularly from 110° to 140° C., as a rule at subatmospheric pressure, advantageously at below 30 mm., continuously or batchwise. Although the use of solvents is not necessary, solvents which are inert under the distillation conditions may be used, examples being cyclic ethers such as tetrahydrofuran or alkanols such as methanol.

The purification may be carried out as follows: a melt of the ester or a solution of the ester in one of the said solvents has the acid added to it with efficient mixing and the mixture is distilled at the distillation temperature. Distillation periods of one hour to two hours in batchwise operation are possible surprisingly without appreciable transesterification or decomposition, but continuous distillation with residence periods of 0.1 second to 600 seconds, particularly at the higher temperatures within the preferred temperature range is more advantageous. Any distillation apparatus may be used, for example sieve plate, Oldershaw, glass tray, bubble tray and valve plate columns and particularly thin-layer or falling film equipment.

The purification may expediently be combined with the production of the ester, the reaction mixture from the production with or without filtration being subjected to a distillation. The first runnings is separated, then the acid is added to the still and the main fraction, i.e. the ester, is distilled off by the process according to this invention.

The present process is set forth schematically in the attached drawing. As is apparent from the drawing, the crude ester is melted or dissolved and then stirred in a mixer with the acid. The resultant mixture is fed continuously to a column at the distillation temperature under reduced pressure. The pure ester is isolated as a sidestream, any light ends and solvent being taken overhead and the acid and impurities being discharged at the bottom.

The 2,2-dimethyl-1,3-propanediol monohydroxypivalic ester purified by the process according to the invention is a valuable starting material for synthetic resins, plasticizers and plastics auxiliaries and may be used for applications requiring very high purity, for example the production of colorless polyesters for the plastics, surface coatings and plasticizer industries.

The following examples illustrate the invention. The parts specified in the examples are parts by weight.

EXAMPLES 1 TO 7

In each case, 200 parts of 2,2-dimethyl-1,3-propanediol monohydroxypivalic ester (whose polyester with maleic anhydride has an iodine color number of 3) is melted in a distillation apparatus and mixed while stirring with:

(1) 1 part of p-toluenesulfonic acid;
(2) 0.2 part of 96% by weight sulfuric acid;
(3) 1 part of mesitylsulfonic acid;
(4) 0.2 part of p-chlorobenzenesulfonic acid;
(5) 1 part of 1-n-butylsulfonic acid;
(6) 0.1 part of chlorosulfonic acid; or
(7) 1 part of 3-isobutenylsulfonic acid, and distilled in the course of 30 to 40 minutes at 2 mm.

In each case 195 to 198 parts of 2,2-dimethyl-1,3-propanediol monohydroxypivalic ester having a boiling point of 128° to 130° C. is obtained after a small amount of first runnings has been separated.

The ester is condensed in each case with the stoichiometric amount of maleic anhydride for 4 hours at 190° C. to form a polyester having an iodine color number of less than 1 and the following APHA color numbers:

(1) 30      (4) 20      (6) 20 and
(2) 20      (5) 35      (7) 30
(3) 30

The iodine color numbers are determined according to DIN 6162 and the APHA color numbers according to American Standard Test Method 1209. A polyester which has been prepared in the same way with an unpurified ester by way of comparison has an iodine color number of 2 to 3 and an APHA color number of more than 200.

We claim:

1. A process for the production of pure 2,2-dimethyl-1,3-propanediol monohydroxypivalic ester which comprises admixing sulfuric aicd or sulfonic acid with the ester obtained by the condensation of hydroxypivalaldehyde by the Tishchenko reaction, distilling the treated ester at a temperature above 100° C., removing the light ends and recovering the pure ester which is distilled off as the main fraction.

2. A process as claimed in claim 1 wherein the distillation is carried out in the presence of sulfuric acid or a sulfonic acid in an amount of from 0.05 to 5% molar of the acid based on the mixture of ester and acid.

3. A process as claimed in claim 1 wherein the distillation is carried out in the presence of sulfuric acid or a sulfonic acid in an amount of from 0.5 to 2% molar of the acid based on the mixture of ester and acid.

4. A process as claimed in claim 1 carried out at a temperature of from 100° to 185° C.

5. A process as claimed in claim 1 carried out at a temperature of from 110° to 140° C.

6. A process as claimed in claim 1 wherein the distillation is carried out as a continuous distillation with a residence time of from 0.1 to 600 seconds.

7. A process as in claim 1 wherein said acid is selected from the group consisting of sulfuric acid, benzenesulfonic acid, benzenedisulfonic acids, toluenesulfonic acids, xylenesulfonic acids, mesitylsulfonic acids, $\alpha$-naphthylsulfonic acids, $\beta$-naphthylsulfonic acids, anthracenesulfonic acids, methylsulfonic acid, ethylsulfonic acid, 1-propylsulfonic acid, isopropylsulfonic acid, 1-n-butylsulfonic acid, 1-pentylsulfonic acid, 1-hexylsulfonic acid, cyclohexylsulfonic acid, isobutenylsulfonic acid, vinylsulfonic acid, anisylsulfonic acid, p-chlorophenylsulfonic acid, anthraquinonesulfonic acid, 2-nitroanthraquinonesulfonic acid, isobutyraldehyde-$\alpha$-sulfonic acid and chlorosulfonic acid.

References Cited
UNITED STATES PATENTS

| | | | |
|---|---|---|---|
| 2,820,055 | 1/1958 | Caldwell et al. | 260—484 |
| 3,057,911 | 10/1962 | Finch | 260—484 |
| 3,446,839 | 5/1969 | Falbe et al. | 260—484 |

WILBUR L. BASCOMB, JR., Primary Examiner

U.S. Cl. X.R.

203—38; 260—484 R

UNITED STATES PATENT OFFICE
CERTIFICATE OF CORRECTION

Patent No. 3,696,005      Dated October 3, 1972

Inventor(s) Werner Fuchs, Franz Merger

It is certified that error appears in the above-identified patent and that said Letters Patent are hereby corrected as shown below:

Column 1, after line 7, insert -- assignors to Badische Anilin &- Soda-Fabrik Aktiengesellschaft, Ludwigshafen am Rhein, Germany --

Signed and sealed this 17th day of April 1973.

(SEAL)
Attest:

EDWARD M. FLETCHER, JR.
Attesting Officer

ROBERT GOTTSCHALK
Commissioner of Patents